United States Patent [19]

Bergeron

[11] 3,917,138

[45] Nov. 4, 1975

[54] BICYCLE LOCKING AND SECURING DEVICES

[76] Inventor: Gregory B. Bergeron, 3631 Midvale Ave., Apt. 6, Los Angeles, Calif. 90034

[22] Filed: Oct. 21, 1974

[21] Appl. No.: 516,401

[52] U.S. Cl. .............................. 224/42.03 B; 211/5
[51] Int. Cl.² ........................................ B62D 43/00
[58] Field of Search .......... 224/42.03 B; 211/17, 18, 211/19, 22, 5; 70/14, 58, 200, 233, 234; 248/203

[56] References Cited
UNITED STATES PATENTS

| | | | |
|---|---|---|---|
| 640,736 | 1/1900 | Biester | 211/19 |
| 1,634,583 | 7/1927 | Kissinger | 70/200 |
| 2,497,797 | 2/1950 | Rogers | 70/58 |
| 3,670,935 | 6/1972 | Hinkston | 224/42.3 B |

*Primary Examiner*—Robert R. Song
*Attorney, Agent, or Firm*—Robert J. Schaap

[57] ABSTRACT

This invention relates to a clamping device for securing a bicycle to a pair of laterally spaced rearwardly extending support rods mounted on a frame which is, in turn, secured to an automotive vehicle. The clamping device comprises a first bracket having a main plate which extends in a direction axially with the support rod and a downwardly extending flange which is apertured to receive this support rod. In addition, the main plate of this first bracket is also apertured to receive an upwardly struck extension on the support rod. The clamping device also comprises a second bracket which is somewhat U-shaped in construction. In this case, one of the flanges on the U-shaped bracket is also apertured to receive the support rod. In like manner, the other of the flanges on the U-shaped bracket is provided with an aperture which essentially aligns with the aperture on the upwardly struck flange of the first bracket in order to receive a conventional lock.

14 Claims, 2 Drawing Figures

1

BICYCLE LOCKING AND SECURING DEVICES

BACKGROUND OF THE INVENTION

This invention relates in general to certain new and useful improvements in clamping devices, and more particularly, to a clamping device for securing a self-powered peddle vehicle to an engine-powered vehicle.

In recent years, the riding of bicycles or so-called "bicycling" has become a very popular recreational pastime and sport. In conjunction therewith, many people have devised ways of tranporting their bicycle on an automotive vehicle to a desired location for riding the bicycle. At the present time, there are several forms of commercially available frame constructions for securing these bicycles to the rear portion of the automotive vehicle.

Generally, these commercially available devices employ a frame which is secured to the bumper or other portion of the automotive vehicle and include a pair of laterally spaced outwardly extending rods. These rods are provided with recessed portions in order to accommodate the main cross-bar of the bicycle so that the bicycle may be supported on the laterally spaced support rods. The lower end of the bicycle is tied to the vehicle by means of straps or other securement means.

However, these commercially available devices suffer from the very practical limitation that they are not capable of providing theft-proof securement. Inasmuch as the bicycle is only essentially tied to the automotive vehicle by means of a strap, and due to the cost factors involved, the stealing of bicycles from vehicles has become rather common.

Heretofore, there has been no commercially available device or even proposed device which is capable of not only securing the bicycle to the automotive vehicle, but locking the bicycle to the vehicle in order to prevent theft. The present invention obviates these and other problems in the provision of a clamping device which not only secures the bicycle to the pair of laterally spaced rearwardly extending support rods, but is so designed to lock the bicycle to the support rods and thereby mitigate against the possibility of theft.

It is therefore the primary object of the present invention to provide a clamping device which is capable of securing and also locking a bicycle to a support rod extending from an automotive vehicle.

It is another object of the present invention to provide a clamping device of the type stated which is aesthetic in appearance and is highly functional in its operation.

It is a further object of the present invention to provide a clamping device of the type stated which includes a pair of cooperating brackets which are designed to secure the bicycle to a pair of rearwardly extending support rods and to receive a conventional lock mechanism for securing the bicycle against theft.

It is an additional object of the present invention to provide a method of securing a bicycle to an automotive vehicle by employing a pair of brackets for retaining the bicycle on the automotive vehicle.

With the above and other objects in view, my invention resides in the novel features of form, construction, arrangement and combination of parts presently described and pointed out in the claims.

GENERAL DESCRIPTION

In general terms, the present invention can be described as a device for removably securing a pedaled, self-powered vehicle, such as a bicycle, which has a main cross-bar to a rod member extending from an engine-powered vehicle, the latter typically adopting the form of an automotive type vehicle.

This device comprises a first bracket including a plate extending generally normal with respect to the axial direction of the rod member. A first flange is formed on this plate and extends outwardly in a first direction from the plate. A second flange is formed on the plate and also extends outwardly in a second direction from this plate. Apertures are formed in the plate and the second flange in order to removably secure the rod member. In addition, the device also comprises a second bracket which includes a somewhat U-shaped member. Furthermore, a cooperating aperture is formed in a portion of the U-shaped member to removably receive an additional portion of the rod member.

This device as described above can be further characterized in that the first direction is generally opposite to the second direction and that these first and second flanges are generally parallel in space. In addition, lock receiving apertures are formed on the first flange of the plate forming part of the first bracket and on the flange in the somewhat U-shaped member. These apertures are capable of being aligned when the brackets are in the locked position in order to receive a locking device.

The second somewhat U-shaped bracket includes a base plate with the first and second flanges extending outwardly from this base plate. These first and second flanges generally will extend outwardly from opposite ends of the base plate and on the same side thereof.

In a preferred embodiment of the present invention, the first and second flanges on the first bracket are secured to the plate at an angle 120° with respect to this plate. In like manner, the first and second flanges of the second bracket are secured to the base plate at an angle of approximately 120°. In this way, a unique locking action is achieved which permits unauthorized rotation of the various brackets and thereby unauthorized removal of the locking device.

The present invention also relates to a method for securing the main cross-bar of this self-powered vehicle to the support rod extending from the automotive vehicle. In this case, the method comprises the disposing of the cross-bar on a recess formed in the support bar. Thereafter, a first flat member forming part of the first bracket is disposed over the cross-bar in such manner that the longitudinal axis of this first flat member is normal to the central axis of the cross-bar. Thereafter, a second flat member forming part of the second bracket is disposed under the cross-bar. As indicated above, these brackets will cooperate with each other in a locking position in order to hold the cross-bar of the vehicle on the support rod. In this way, a portion of the cross-bar is inserted in an aperture on the first flange of the first flat member, and another portion of the cross-bar is inserted through a second aperture located in the flat member itself. Finally, the method includes locating still another portion of this cross-bar in an aperture of a flange on the second flat member.

BRIEF DESCRIPTION OF THE DRAWINGS

Figure 1:
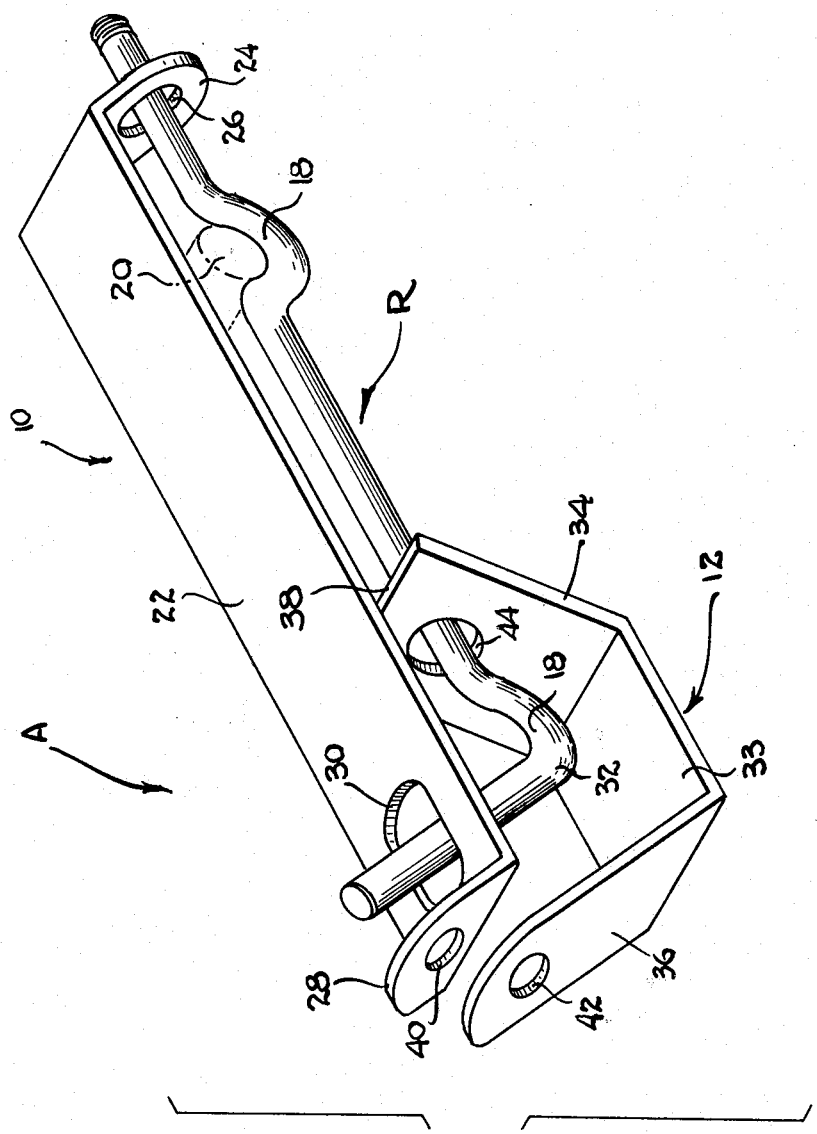
Figure 2:
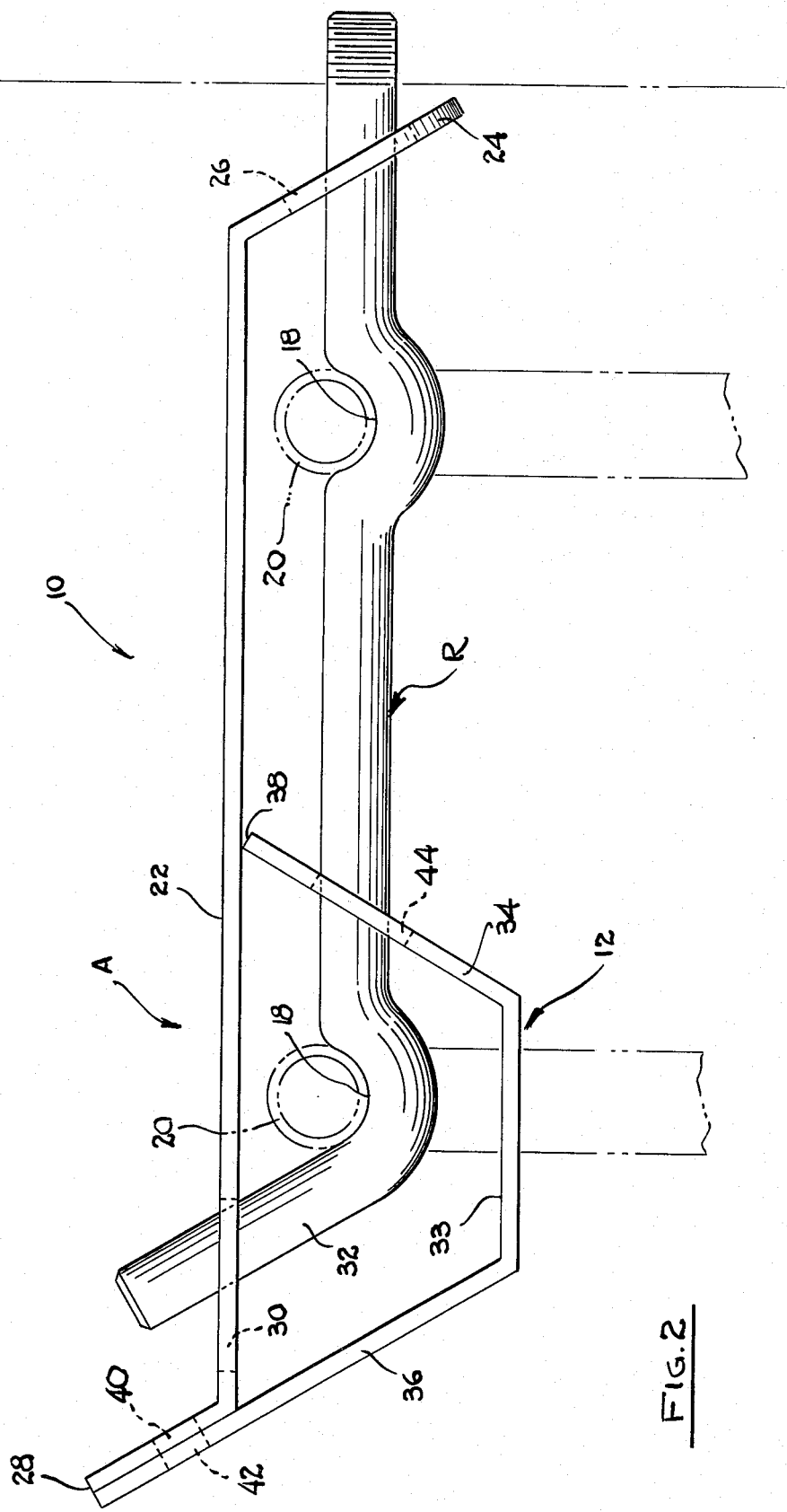

Having thus described the invention in general terms, reference will now be made to the accompanying drawings in which:

FIG. 1 is a perspective view of a pair of brackets which form the clamping mechanism of the present invention in cooperative, but spaced apart relationship; and FIG. 2 is a perspective view of the brackets forming part of the clamping mechanism in a position to lock a bicycle to a pair of extending support rods from an automotive vehicle.

DETAILED DESCRIPTION

Referring now in more detail and by reference characters to the drawings which illustrate a preferred embodiment of the present invention, A designates a clamping device comprised of an upper bracket 10 and a lower generally U-shaped bracket 12 which are designed to secure a bicycle to a support mechanism on an automotive vehicle.

It should be observed that the drawings of the present invention only illustrate one rearwardly extending support rod, designated as R, forming part of the support mechanism; although the support mechanism generally includes a pair of such laterally spaced rearwardly extending support rods. Moreover, these support rods are generally secured to a somewhat inverted U-shaped bracket, or so-called "hoop" (not shown), secured to the automotive vehicle in such manner that the support rods extend rearwardly from the hoop and the vehicle.

By reference to FIG. 2 of the drawings, it can be observed that the support rod R includes a pair of U-shaped recesses 18 in order to receive the main cross-bar 20 of a bicycle. In this respect, it should be observed that the typical bicycle includes a longitudinally extending, generally round cross-bar which connects the frame portion holding the seat of the bicycle to the steering column of the bicycle.

While the clamping device of the present invention has been described in connection with supporting a bicycle on an automotive vehicle, it should be understood that this clamping device is capable of being used in a wide variety of environments in order to secure a self-powered vehicle, such as a bicycle, to a motor powered vehicle, or otherwise to a fixed retaining structure.

The first or upper bracket 10 generally comprises a plate 22 which extends in a direction normal to the central axis of the support rod R. The plate 10 is integrally provided at its forward end, that is the end in closest proximity to the automotive vehicle (not shown), with a downward, angularly-struck flange 24. This flange 24 is provided with an enlarged, elongated aperture 26 in order to accommodate the support rod R. In this respect, it should be observed by reference to FIGS. 1 and 2, that this aperture 26 is substantially larger in cross section than the support rod R.

At its forward end, the plate 22 is provided with an upward, angularly-struck flange 28. Moreover, the plate 22 is provided with an enlarged, elongated aperture 30 in close proximity to the flange 28. The aperture 30 is designed to receive an upwardly-struck extension 32 integrally formed with the support rod R, and, in this respect, it can be observed that the upwardly-struck extension 32 is normally angularly located with respect to the central axis of the support rod R. In addition, and in many conventional devices, the outermost recess 18 is located at the point of connection of the extension 30 to the main rod R.

The lower bracket 12 operates in conjunction with the upper bracket 10 in the manner to be hereinafter described in more detail. This bracket 12 normally comprises a relatively horizontal lower plate or base plate 33 which is provided at its forward end with an upwardly and forwardly struck flange 34. At its rearward, or outermost, end, the lower plate 33 is provided with an upwardly and forwardly struck flange 36, in the manner as illustrated in FIGS. 1 and 2 of the drawings.

The lower bracket 12, when operating in combination with the upper bracket 10, is located so that the lower plate 33 is normally parallel to the plate 22. Moreover, when acting in combination, the flange 36 is generally parallel to the flange 28. In this respect, it should be observed that both the flanges 28 and 36 are arcuately shaped at their upper ends, as is the flange 24 arcuately shaped at its lower end. However, the flange 34, in a preferred construction of the present invention, is generally provided with a relatively flat marginal edge 38 which engages the underside of the plate 22.

The flange 28 of the upper bracket 10 and mating flange 36 of the lower bracket 12 are both provided with apertures 40 and 42, respectively, which are capable of being aligned when operating in conjunction with each other in order to receive the locking ring or so-called "bolt" (not shown) of a conventional padlock (also not shown). In addition, the flange 34 is provided with an enlarged, circularly-shaped aperture 44 which is designed to receive the support rod R, in the manner as illustrated in FIG. 2 of the drawings. Again, and in the same connection, it can be observed that the aperture 44 is diametrally enlarged with respect to the rod R.

Both of the brackets 10 and 12 are preferably made from a lightweight metal, such as aluminum, magnesium or the like. However, it should be observed that the brackets could be made from heavy metals such as iron or steel, or otherwise from plastics, e.g. polyvinly chloride, etc., or other forms of reinforced plastic materials, e.g. epoxy resin fiberglass compositions, etc.

OPERATION

When it is desired to use the clamp A, the rod R is extended through the aperture 26 of the flange 24 by pivoting the bracket 10 so that the flange 24 is greatly angulated with respect to the central axis of the rod R. In like manner, the aperture 44 is extended over the extension 32 of the rod R and then onto the main shaft of the rod R so that bracket 12 assumes the position as illustrated in FIG. 2 of the drawings. In this case, it can be observed that the upper portion of the flange 36 lies parallel to and in juxtaposition to the flange 28 of the upper bracket 10. Finally, the upper bracket 10 is pivoted downwardly so that the extension 32 extends through the aperture 30 located in the plate 22. In this position, it can be observed that the apertures 40 and 42 are designed so that they are essentially aligned in order to receive the locking ring of a conventional padlock (not shown).

When in the locked position, the upper margin 38 of the flange 34 engages the underside of the plate 22. Moreover, the upper portion of the flange 36 lies in facewise engagement with the upper portion of the flange 28 so that the two apertures 40 and 42 are actually aligned.

In a preferred embodiment of the present invention, each of the components lie in an exact angular relationship with respect to the other components forming part of the clamp A. In this case, the flange 28 extends upwardly and outwardly with respect to the normal plane of the plate 22 at an angle of 120°. In like manner, the flange 24 extends downwardly and rearwardly with respect to the normal plane of the plate 22 at an angle of 120°. The upwardly extending flange 36 also extends upwardly and outwardly with respect to the normal plane of the plate 33 at an angle of 120° and, similarly, flange 34 extends upwardly and forwardly with respect to the plate 33 at an angle of 120°.

In a preferred embodiment of the present invention, the elongated aperture 26 has a longitudinal centerline which is spaced from one lateral edge of the flange 24 by ¾ inch. Furthermore, the aperture 26 is defined by a pair of major axes which are ¾ inch in radius such that the major center points of the axes are spaced 3/16 inch apart from each other. The upper bracket 10 has an overall thickness which will not exceed ⅛ inch thickness. In addition, the aperture 30 is also defined by a pair of axes which define the opposite ends of the elongated aperture by a radius of 1/32 inch in length. In addition, the transverse dimension of the aperture 30 is approximately ⅝ inch in dimension. Moreover, the central axis of the aperture 30 is spaced apart from each of the laterally spaced margins of the plate 22 by ¾ inch. Finally, one of the major axes defining the aperture 30 is located at ½ inch from the forwardly extended edge of the plate 22 and the other central axis defining the oval shaped aperture is spaced at a distance of 1 ⅛ inches from the forwardly presented edge of the plate 22. Each of the apertures 40 and 42 has a radius of ¾ inch and, moreover, the edge of the apertures 40 and 42 are spaced from the laterally spaced margins of the plate by ¾ inch.

Also in the preferred embodiment of the present invention, the lower somewhat U-shaped bracket 12 has an overall plate thickness which will not exceed ⅛ inch. The dentral diameter of the aperture 44 is preferably located at 1 ¼ inches from the point of joinder of the flange 34 to the base plate 33. In like manner, the central axis of the aperture 42 is located at a distance of ⅝ inch from the point of joinder of the flange 36 to the plate 33. In addition, and in the preferred embodiment of the present invention, the aperture 44 is located 1 ¼ inches from the point of joinder of the flange 34 to the plate 33. In like manner, the central axis of the aperture 42 is located at a distance of 2 ⅝ inches from the point of joinder of the flange 36 to the base plate 33.

One of the unique aspects of the present invention is that the components are so designed and shaped in order to secure and lock the main cross-bar 10 of the bicycle onto the rod R. In this respect, it should be observed that this main cross-bar 10 extends into and is support on the U-shaped recesses 18 of each of a pair of laterally aligned support rods R. Consequently, since each support rod R is provided with a pair of longitudinally spaced recesses 20, they are designed to support two longitudinally spaced bicycles. Consequently, it should be observed that a separate clamping device A of the present invention would be used in connection with each of the laterally spaced support rods R.

When in the clamped position, the upper margin 38 of the flange 34 engages the underside of the plate 22 and the rearwardly presented surface of the flange 36 engages the forwardly presented surface of the flange 28, as previously described. Moreover, the aperture 26 and the aperture 30 are so designed so that the support rod R cannot be unauthorizedly removed from the extension 32 of the support rod R. In this respect, the apertures 26 and 30 must be suitably sized in order to accommodate the components of the support rod R, but are nevertheless sufficiently sized so that unauthorized removal of the upper bracket 10 cannot be achieved. In the same respect, the aperture 44 is also suitably enlarged in order to accommodate the support rod R. Nevertheless, it can be observed that when pivoting each of these components simultaneously, the extension 32 cannot be removed from the upper aperture 30. Consequently, the upper bracket 10 is physically located with respect to the lower bracket 12 to restrain movement of the two brackets beyond a limited degree and thereby prevent unauthorized removal of the clamping device A. In this respect, it should be observed that the margin of the aperture 44 fixedly engages the main shank of the support rod R when held in the restrained position. In addition, the extension 32 of the support rod R fixedly engages a margin of the aperture 30 so as to prevent shiftable movement of the two brackets 10 and 12 in this restrained position. In actuality, the bracket 10 could be rotated slightly, but the aperture 30 could not be rotated sufficiently to enable the extension 32 to be inadvertently removed therefrom.

Thus, there has been illustrated and described a novel clamping device which can be made at relatively low cost and used for a variety of applications and which therefore fulfills all the objects and advantages sought therefor. Many changes, modifications, variations and other uses and applications of the subject clamping device will become apparent to those skilled in the art after considering this specification and the accompanying drawings. All such changes, modifications, variations and other uses and applications which do not depart from the spirit and scope of the invention are deemed to be covered by the invention which is limited only by the following claims.

Having thus described my invention, what I desire to claim and secure by Letters Patent is:

1. A device for removably securing a pedaled self-powered vehicle having a main cross-bar to a rod member extending from an engine-powered vehicle, said device comprising:
  a. a first bracket comprising:
    1. a first plate extending generally with respect to the axial direction of said rod member,
    2. a first flange on said first plate extending outwardly in a first direction from and at an oblique angle with respect to said first plate,
    3. a second flange on said first plate extending outwardly in a second direction from and at an oblique angle with respect to said first plate and where the second flange is generally parallel to said first flange, and
    4. means forming first and second apertures in said first plate and said first flange to removably receive said rod member, and
  b. a second bracket comprising:
    1. a somewhat U-shaped member including a second plate and third and fourth outwardly extending flanges extending from said second plate,
    2. means forming a cooperating aperture in the third flange of the somewhat U-shaped member to removably receive a portion of the rod member, and 3. cooperating locking means associated with said second flange and said fourth flange to provide a locking action therebetween.

2. The device of claim 1 further characterized in that the first direction is generally opposite to said second direction, and that said first and fourth flanges are generally parallel in space.

3. The device of claim 1 further characterized in that said lock receiving apertures are formed in the second flange on said first plate and in the fourth flange of said somewhat U-shaped member which are capable of being aligned to receive a locking device.

4. The device of claim 1 further characterized in that said second bracket comprises said second plate and said third and fourth flanges which extend outwardly from said second plate at oblique angles with respect thereto.

5. The device of claim 4 further characterized in that said third and fourth flanges on said second plate of said second member extend outwardly from opposite ends of said second plate such that said fourth flange is generally parallel to said second flange and said third flange is non-parallel to said first flange.

6. The device of claim 1 further characterized in that said first and second flanges are secured to said first plate of said first bracket at oblique angles of approximately 120°, and the third and fourth flanges of said second bracket are secured to said second plate at oblique angles of approximately 120°.

7. The device of claim 1 further characterized in that said cooperating locking means comprises alignable apertures in said second and fourth flanges which are capable of receiving a locking member.

8. A clamping assembly for securing the main cross-bar of a bicycle to a support rod on an engine-powered vehicle, said clamping assembly comprising:
 a. a first bracket having a main first plate for holding said cross-bar on said support rod,
 b. said bracket having first and second outwardly struck flanges extending outwardly from said first plate in somewhat parallel planes,
 c. means forming an aperture on said first main plate to receive an outwardly struck section on said support rod,
 d. a second bracket having a second plate and a first bracket section and a second bracket section on said second plate and said second plate having an aperture to receive said cross-bar and hold same on said support rod,
 e. said last named first bracket section of said second bracket having a margin which engages said main first plate when in a position where said first and second brackets are locked together,
 f. and aperture means on one of the flanges of said first bracket and one of the bracket sections of said second bracket for receiving a lock to securely hold the cross-bar of said bicycle to said support rod on said engine-powered vehicle.

9. The clamping assembly of claim 8 further characterized in that said first and second flanges on said first bracket extend from said main first plate at opposite ends thereof and in opposite directions.

10. The clamping assembly of claim 8 further characterized in that said pair of outwardly extending bracket sections on said second plate are flanges which extend from opposite ends thereof and extend outwardly on the same side thereof.

11. A method for securing the main cross-bar of a self-powered pedaled vehicle to a support rod extending from an engine-powered vehicle, said method comprising:
 a. disposing a first bracket having a first flat member over a support rod extending from an engine powered vehicle,
 b. disposing a second bracket having a second flat member under said support rod,
 c. temporarily shifting said first and second brackets from their normal rest position when supporting and holding a pedaled vehicle,
 d. disposing the cross-bar of said self-powered vehicle on a recess formed in said support rod,
 e. disposing said first flat member of said first bracket over said cross-bar in such manner that a longitudinal axis of said first flat member is normal to the central axis of said cross-bar,
 f. disposing said second bracket having said second flat member under the cross-bar of said self-powered vehicle,
 g. locating a portion of the cross-bar in an aperture on a first flange on said first flat member and another portion of said cross-bar in a second aperture on the first flat member,
 h. locating still another portion of said cross-bar in an aperture of a first flange section on said second flat member,
 i. locating a second flange on said first member which extends outwardly therefrom in generally parallel relationship to said first flange in generally parallel relationship to a second flange section on said second flat member, and
 j. establishing a locking action between cooperating locking means on said second flange on said first flat member and the second flange section on said second flat member.

12. The method of claim 11 further characterized in that the method comprises engaging the first flange section on said second flat member with the first flat member when in the secured position.

13. The method of claim 11 further characterized in that the method comprises engaging said second flange on said first flat member with said second flange section on said second flat member when located in said generally parallel relationship and when said brackets are in the secured position.

14. The method of claim 13 further characterized in that said cooperating locking means are alignable apertures and the method comprises inserting a locking member through the alignable apertures.

* * * * *